(12) United States Patent
Ramm et al.

(10) Patent No.: US 8,409,381 B2
(45) Date of Patent: Apr. 2, 2013

(54) METHOD AND SYSTEM FOR BONDING WIND TURBINE BLADES

(75) Inventors: Uli Ramm, Osnabrueck (DE); Jacob Johannes Nies, Zwolle (NL)

(73) Assignee: General Electric Company, Schenectady, NY (US)

(\*) Notice: Subject to any disclaimer, the term of this patent is extended or adjusted under 35 U.S.C. 154(b) by 0 days.

(21) Appl. No.: 13/114,683

(22) Filed: May 24, 2011

(65) Prior Publication Data
US 2012/0024457 A1 Feb. 2, 2012

(51) Int. Cl.
*B32B 41/00* (2006.01)

(52) U.S. Cl. .......... 156/64; 156/125; 156/145; 156/146; 156/147

(58) Field of Classification Search .......... 156/64, 156/125, 145, 146, 147; 264/511
See application file for complete search history.

(56) References Cited

U.S. PATENT DOCUMENTS

| | | | |
|---|---|---|---|
| 6,800,956 B2 | 10/2004 | Bartlett | |
| 8,047,800 B2 * | 11/2011 | Nies | 416/232 |
| 2007/0036659 A1 | 2/2007 | Hibbard | |
| 2009/0257881 A1 * | 10/2009 | Ostergaard Kristensen et al. | 416/229 R |
| 2011/0211970 A1 * | 9/2011 | Nies | 416/231 R |

\* cited by examiner

*Primary Examiner* — George Koch
(74) *Attorney, Agent, or Firm* — Dority & Manning, P.A.

(57) ABSTRACT

A method and associated system are provided for bonding component parts of a wind turbine blade along a bond line. A barrier is placed within an internal cavity of the blade at a defined bond line width along the length of the bond line. A plurality of spaced apart external access ports are defined along the bond line into the internal cavity. A bond paste is sequentially injected into the plurality of access ports to fill the bond line.

9 Claims, 5 Drawing Sheets

METHOD AND SYSTEM FOR BONDING WIND TURBINE BLADES

FIELD OF THE INVENTION

The present invention relates generally to the field of wind turbines, and more particularly to methods for bonding component parts of wind turbine blades.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell member and a lower (pressure side) shell member that are bonded together at bond lines along the trailing and leading edges of the blade. Internal spar caps and a shear web are also bonded to each of the shell members. The bond lines are generally formed by applying a suitable bonding paste or compound along the bond lines at a minimum designed bond width between the shell members before the molds are brought together to join the shell members. The bond paste, however, tends to migrate well past the designed bond width and into the interior blade cavity, particularly along the trailing edge of the blade. This excess bond paste can add considerable weight to the blade and, thus, adversely affect blade dynamic properties and overall performance of the wind turbine. The excess bond paste can also break off and cause damage to interior structure and components during operation of the wind turbine, as well as generate excessive noise as the blades rotate.

Accordingly, the industry would benefit from an improved method and system for bonding component parts of a wind turbine blade that reduces at least certain of the disadvantages of prior methods.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided for bonding component parts of a wind turbine blade along a bond line. The method is applicable, for example, for bonding upper and lower shell members along the leading and trailing edge of the wind turbine blade, or for bonding the shear web to the shell members within the internal cavity of the blade. The method includes placing one or more barriers within the internal cavity of the blade at a defined bond line width along the length of the bond line. A plurality of spaced apart external access ports are defined along the bond line that provide external access into the internal cavity of the shell members. A suitable bond paste is sequentially injected into the plurality of access ports to fill the bond line.

In a particular embodiment, the method involves placing the barrier between the upper and lower shell members along a bond line (e.g., the trailing or leading edge bond lines) at the defined bond width and defining the external access ports with a plurality of spaced apart hoses placed between a gap at the edges of the upper and lower shell members or, in an alternative embodiment, through holes or passages in the shell members. The hoses have an external end and an internal end that extends into the internal cavity within the dimensions of the bond defined by the barrier. The barrier and hoses may be placed prior to infusion of the shell members in their respective molds, which may require capping the internal end of the hoses prior to the infusion process. The hoses are opened prior to the injecting step.

The sequential injecting step may involve injecting the bond paste into the hoses in sequence, wherein the injecting step is sequenced to a next subsequent hose upon detection of the bond paste at the respective next subsequent hose. The sequential operation may start at a first hose and progress to a last hose, or may start at an intermediate hose and progress in either or both directions along the bond line. Presence of the bond paste at a hose may be detected in various ways, including visual inspection. In a unique embodiment, presence of the bond paste is determined by detecting a change in air pressure in the hose caused by the presence of the bond paste within the internal cavity migrating to the hose. This may be done by measuring the ambient pressure within the hose, which will increase as bond paste migrates into the hose, or by injecting air into the hose and detecting a restriction of the airstream through the hose caused by the presence of the bond paste within the internal cavity migrating to the hose.

Other methods may also be used for detecting the absence or presence of the bond paste at a particular hose. For example, a change in light conditions may be detected through the hose as a result of the bond paste migrating to the hose. A variety of other suitable detection methods may also be utilized, including capacitive sensors. The type and location of sensors may depend on the viscosity of the bond paste. It should be appreciated that the invention is not limited to any particular type of sensor or detection technique.

After the injecting step, the external ends of the hoses can be trimmed and sealed, with the remaining portion of the hoses left permanently between the shell members.

In an embodiment wherein the method is used for bonding a shear web bond line, the access ports may be defined through a shell member along the shear web bond line. A plurality of hoses may be inserted through holes or ports defined in the shell members such that the internal end of the hoses extends into the bond area defined by the barrier along the shear web bond. The shear web bond line may also be accessed through gaps in the shell member along either or both of the trailing and leading edges.

The injection step may be accomplished in various ways, including manual or machine injection. In a particular embodiment, an injection system is utilized that has a bond paste delivery system and a distribution system in flow communication with the delivery system and configured for connection with the access ports for supplying the bond paste along the bond line. In a particular embodiment, the delivery system includes a pump that is supplied with bond paste from a reservoir, and the distribution system includes any suitable configuration of hoses, valves, manifold, or other type of conduction member to convey the bond paste from the pump to the access ports. In a unique embodiment, the delivery system is configured as a machine or vehicle that runs in a course alongside the blade and sequentially connects and disconnects to the access ports as the machine moves along the bond line. The machine may have a bond paste reservoir and pump to distribute the bond paste through the distribution system, which may include any configuration of hoses, valves, and the like, that connect to the access ports. The machine may be configured with any manner of pressure sensor, air line, light sensor, and the like, to detect the presence of the bond paste in the downstream hose, as discussed above. The injection machine may be configured to simultaneously inject bond paste along two or more separate bond lines, or multiple hoses in the same bond line. Branches of the feeding lines may be equipped with valves to control where the flow of paste is directed.

In further aspects, the invention also encompasses a system for bonding components of a wind turbine blade along a bond line, aspects of which are discussed above. In certain embodiments, the system includes a bond paste reservoir, and a pump with an intake in communication with the reservoir. One or more supply hoses or other types of conduction members are in communication with the pump and have an end configured for connection with a first access port in the wind turbine blade to supply the bond paste to an internal bond line within the wind turbine blade. A sensor is configured to detect the presence of bond paste that migrates along the bond line from the first access port to an adjacent access port. A controller is in communication with the pump and the sensor to control flow of the bond paste into the first access port as a function of detection of bond paste at the adjacent access port, for example to terminate flow into the first access port when the paste is detected at the adjacent access port.

The sensor, in on embodiment, may be an air pressure sensor that detects a change in air pressure at the adjacent access port as a result of migration of the bond paste to the adjacent access port. In another embodiment, the sensor may be a pressure line that mates with the adjacent access port, wherein detection of a restriction of the airflow is an indication that the bond paste has migrated to the adjacent access port. In still a further embodiment, the sensor may be a light sensor that detects changes in light conditions due to the absence or presence of the bond paste.

The system may be configured for simultaneous filling of multiple bond lines along the blade with a plurality of the supply hoses and sensors.

In a particular embodiment, the system is configured as a movable vehicle that travels along the wind turbine blade for the bonding process.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Figure 1:
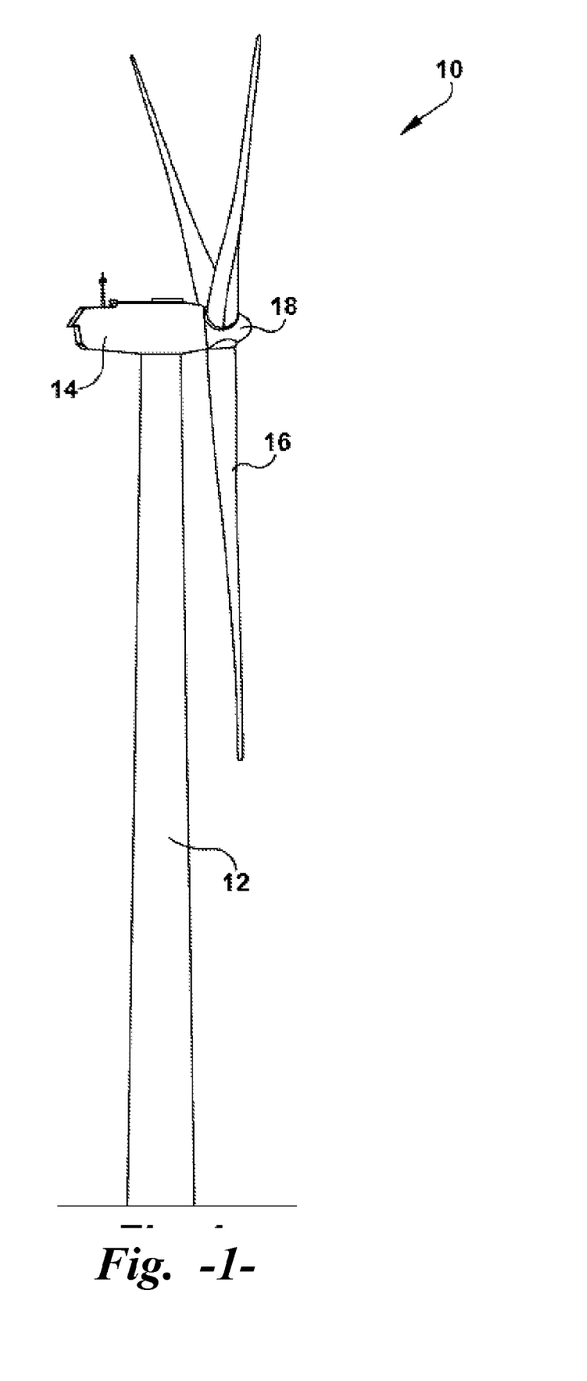
FIG. 1 is a perspective view of a conventional wind turbine.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine or blade configuration.

Figure 2:
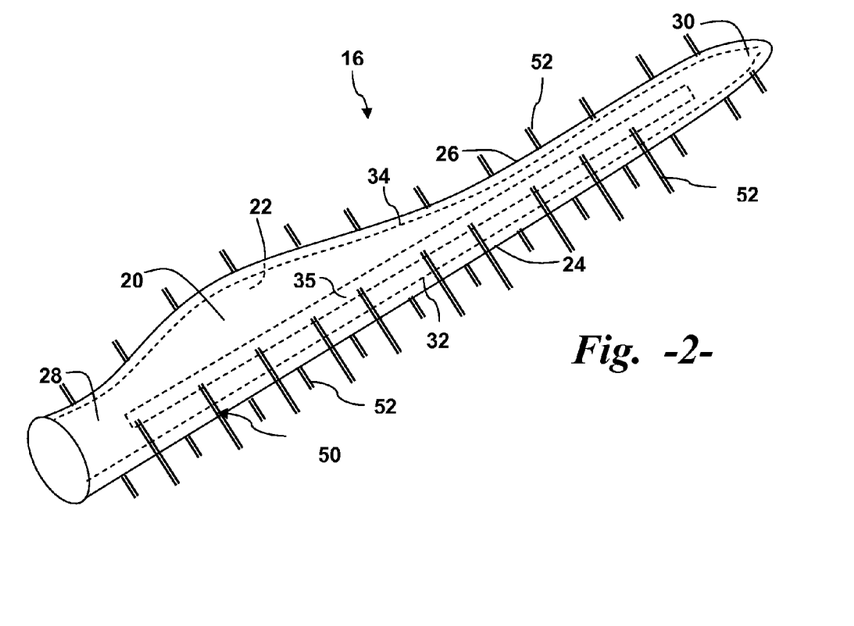
FIG. 2 is a perspective view of a wind turbine blade configured with multiple access ports for filling of internal bond lines.
Figure 3:
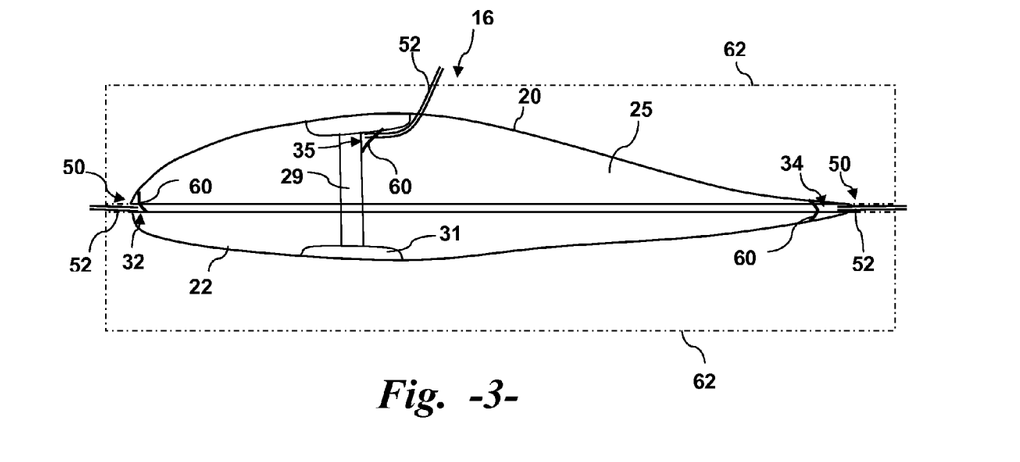
FIG. 3 is a cross-sectional view of the shell members of an exemplary wind turbine blade within respective molds and configured with access ports for subsequent filling of internal bond lines in accordance with aspects of the invention.

FIG. 2 is a more detailed view of aspects of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a leading edge bond line 32 and a trailing edge bond line 34. An internal shear web bond line 35 is typically used to bond the shear web 29 to the internal spar caps 31 (FIG. 3). In formation of these bond lines 32, 34, 35 a bond paste 36 (FIG. 5) is injected in flowable viscous form between the mating laminate surfaces of the upper shell member 20 and lower shell member 22 along the length of the bond lines 32, 34, or through the shell members for the bond line 35, as explained in greater detail below.

It should be appreciated that the term "bond paste" is used herein in a generic sense to encompass any type of adhesive or bonding material that is applied in an initially flowable state. The particular type of bond paste 36 is not particularly relevant to the present invention, and any suitable type of epoxy, adhesive compound, or other material may be used in this regard.

The bond paste 36 is applied in a sufficient quantity and pattern so as to establish a designed bond line width 38 and thickness 40 (FIG. 4) at the various bond lines 34, 35, 36 to ensure a minimum bonded surface area between the components along the length of the respective bond lines. The design criteria for the bond width 38 and thickness 40 may vary between different types of blades based on any combination of design factors, as is well understood by those skilled in the art.

Figure 4:
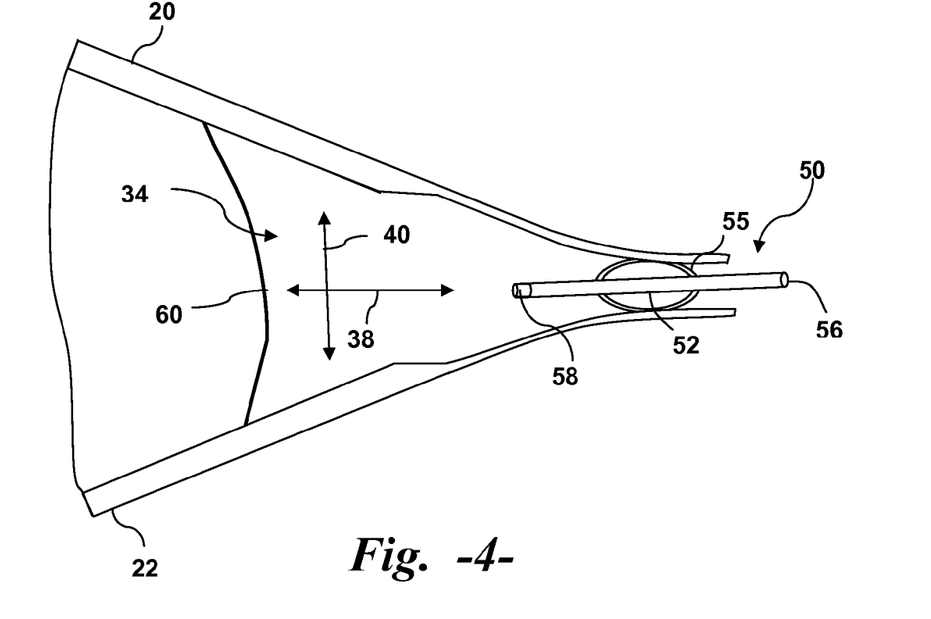
FIG. 4 is an enlarged cross-sectional view of the trailing edge of a wind turbine blade in accordance with aspects of the invention.

As mentioned, the present method relates to bonding components of the wind turbine blade 16 along the bond lines 32, 34, and 35. Referring to FIGS. 2 through 4 in particular, the method involves placing a barrier 60 within the internal cavity 25 of the blade at the location of the defined bond width 38 along the longitudinal length of the bond line. This barrier 60 may be any manner of rigid, semi-rigid, or pliant material that functions as a dam against the flow of the bond paste. The barrier 60 may, for example, be a semi-rigid member having a pre-formed shape, such as a concave or convex shape. The barrier 60 may be a pre-formed wire screen or other air-permeable material that allows the passage of air therethrough while impeding the flow of the bond paste through the screen. The barrier 60 may be adhered in place between the shell members 20, 22, or against the shear web 29 and spar caps 31, with any manner of suitable adhesive resin or the like to ensure that the barrier 60 is not displaced by the bond paste during the bonding process.

Because the barriers 60 prevent uncontrolled flow of the bond paste 36 into the internal cavity 25 of the blade, the present method may provide the additional benefit that the viscosity of the bond paste 36 may be increased or otherwise modified to ensure a more complete application and elimination of air pockets or voids between the shell members 20, 22 along the respective bond lines 32, 34, 35.

Referring again to FIGS. 2 through 4, a plurality of spaced apart external access ports 50 are defined along the bond line to be filled. In FIG. 2, a plurality of these ports 50 are provided along the leading edge bond line 32, the shear web bond line 35, and the trailing edge bond line 34. These access ports 50 may be variously configured within the scope and spirit of the invention. In the illustrated embodiment, the access ports 50 are defined by hose members 52 that have an externally accessible end and an opposite end that is disposed within the internal cavity of the bond line, particularly within the dimensions of the bond line defined by the barrier member 60. For example, referring to FIG. 3, the plurality of hoses 52 along the leading edge bond line 32 are inserted between the upper and lower shell members 20, 22 and extend into the leading edge bond line that is defined by the barrier member 60. Likewise, a plurality of the hoses 52 are inserted through holes or passages defined in the laminate layers of the upper shell member 20 along the upper shear web bond line 35 and extend into the bond line area defined by the barrier member 60. Similarly, a plurality of the hoses 52 are placed between the upper and lower shell members 20, 22 along the trailing edge bond line 34 within the bond area defined by the barrier 60. The trailing edge bond line configuration is illustrated in greater detail in FIG. 4. It should also be appreciated that the hoses 52 for the shear web bond line 35 may be disposed through the gap between the shell members 20, 22 along either or both of the leading or trailing edges. Likewise, the hoses 52 for the leading and trailing edge bond lines 32, 34 may be disposed through holes or passages defined through the shell members 20, 22.

The various hoses 52 may be rigid, semi-rigid, or flexible, and are designed so as not to collapse or kink during the bonding process.

The method further involves at least partially sequentially injecting a flowable bond paste 36 into the plurality of access ports 50 (e.g., hoses 52) along the respective bond line in order to fill the bond line along the longitudinal length thereof within the area defined by the barrier 60. This bond line area has a width dimension 38 and a height dimension 40, as depicted in FIG. 4, defined by the barrier 60 and internal surfaces of the upper and lower shell members 20, 22 along the leading and trailing edges 24, 26. Along the shear web bond line 35, the dimension of the bond area is defined by the barrier 60 and structure of the spar caps 31 and shear web 29.

Figure 8:
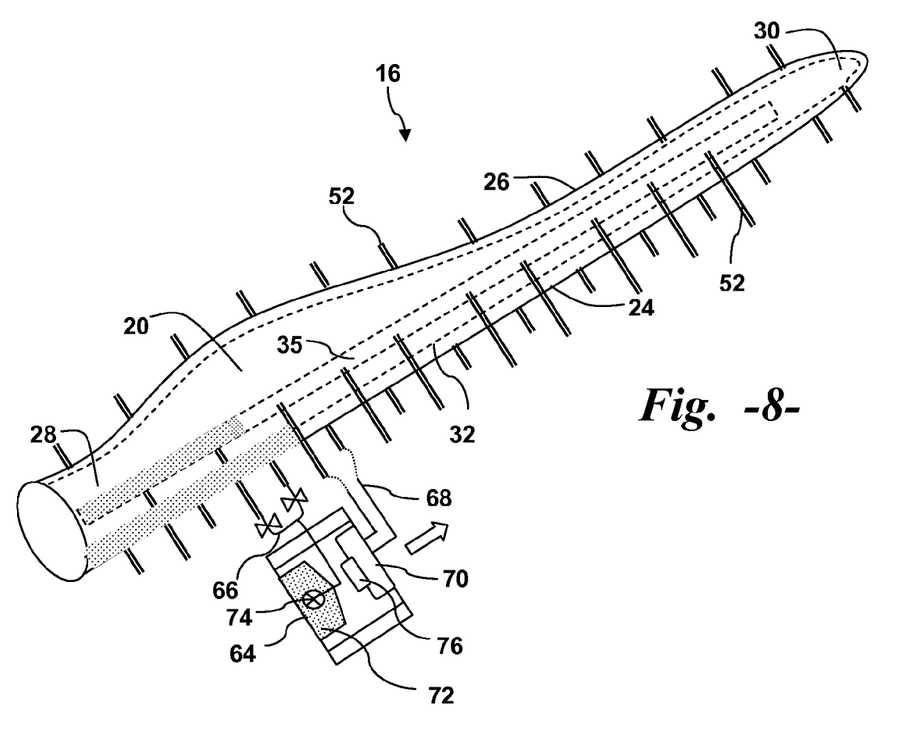

The invention encompasses any manner of injecting the bond paste through the hoses 52 in a sequential manner, including manual injection or machine injection. Referring to FIG. 8, for example, the bond paste is injected into a first one of the access hoses 52, which may be at either end of the respective bond line or intermediate of the ends. In the embodiment of FIG. 8, the bonding process was started at the root end 28 of the blade 16. As the bond paste is injected into the first access hose 52, it will fill the bond area defined by the barrier 60 and migrate longitudinally along the length of the bond line. When the bond paste is detected at the next adjacent access port or hose 52, the operation ceases injecting at the first hose 52 and moves to injecting the bond paste at the adjacent hose 52. The injection process starts again until migration of the bond paste is detected at the next adjacent downstream access hose 52, wherein the process shifts and repeats. It should thus be appreciated that this sequential injection of the bond paste 36 into adjacent access ports 50 as a function of detection of the bond paste at the adjacent access port ensures a complete and uniform filling of the bond paste 36 along the entire longitudinal length of the bond line with a minimum risk of voids or air pockets being defined along the bond line.

Referring to FIG. 3, the blade shell components 20, 22 can be formed in the conventional molding process within their respective molds 62. The barriers 60 and hoses 52 are placed between the components prior to infusion of the shell members 20, 22. For the hoses 52 that extend through the shell members for the shear web bond lines 35, fiber mat reinforcements may be placed around the hoses.

Referring to FIG. 4, caps 58 may be used to seal the internal ends of the hoses 52 during the infusion process. In this manner, atmospheric pressure within the tube will prevent the tube from being collapsed during the infusion process. The cap 58 is subsequently removed or "broken" prior to injecting bond paste through the hose 52.

Figure 5:
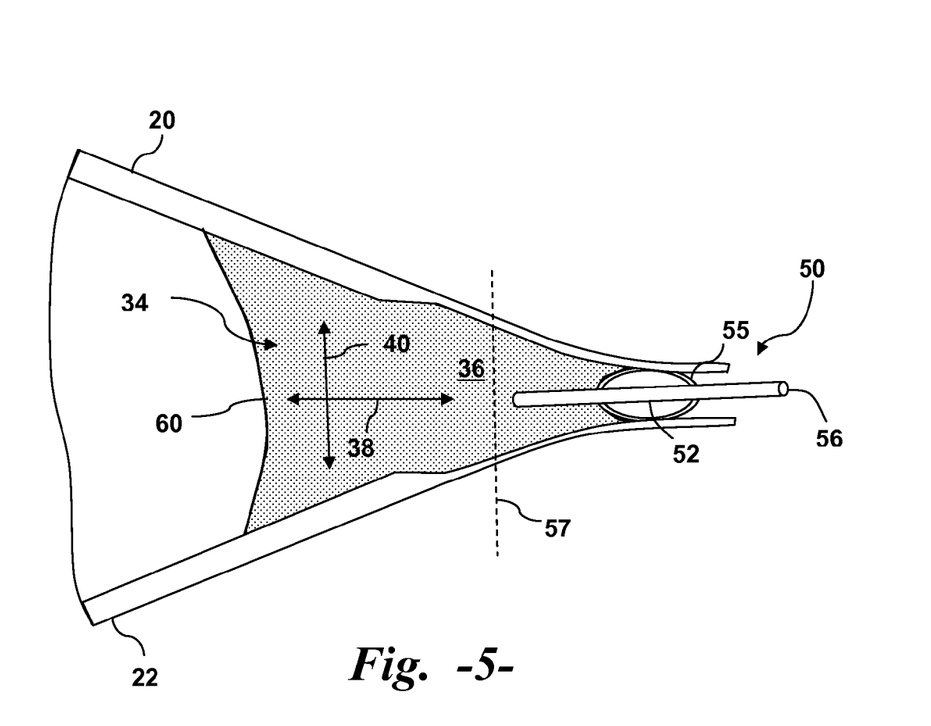
FIG. 5 is a view of the trailing edge of FIG. 4 filled with a bond paste.

FIGS. 4 and 5 depict a particular arrangement for insertion of the hoses 52 along the trailing edge access ports 50. The hoses are inserted between the skins of the upper and lower shell members 20, 22 and are retained in place by a flexible bladder 55, which also servers prevent the bond paste from migrating out from the trailing edge bond line 34 during the bonding process. This bladder may be, for example, an inflatable member, a compressible member, or any other suitable sealing member. FIG. 5 depicts the configuration of FIG. 4 after injection of the bond paste 36. The shell members 20, 22 will eventually be trimmed at the trim line 57 after the paste 36 has cured to provide the desired bond width dimensions 38, 40.

The hoses 52 are generally located in non-stressed areas of the shell members 20, 22 so as not to adversely affect the structural integrity of the blade 16.

Figure 7:
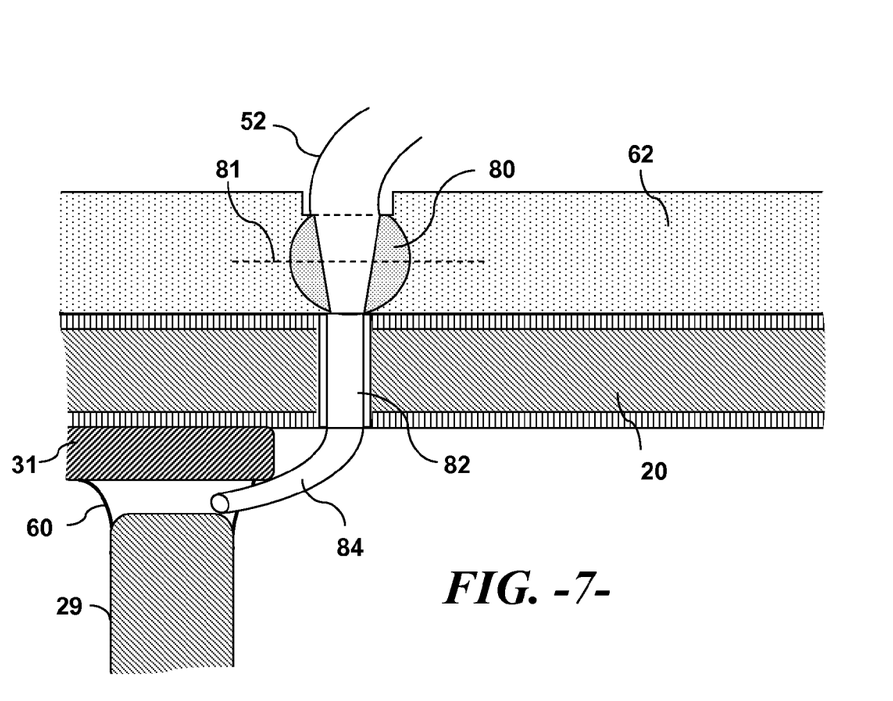
FIG. 7 is a side cut-away view of a unique ball joint connection for injection of bond past through a shell member; and, FIG. 8 is a perspective view of the blade of FIG. 2 with a system in accordance with aspects of the invention configured therewith for filling of multiple internal bond lines.

FIG. 7 depicts a useful infusion point configuration along the shear web bond line. A ball valve or other type or articulable device 80 is located within the mold member 62. A cone-shaped passage is defined through the ball valve 82. With this tapered cone shape, cured adhesive within the ball valve 82 is more easily removed. The cone shape and articulation of the ball valve 82 (relative to axis 81) within the mold 62 also facilitates release of the shell member 20 from the mold 62. A tube 82 is configured within the shell member 20 and defines a flow passage through the shell member for the bond paste. This tube 82 may be left in the shell member, and thus should be compatible with the shell member 20 and cured bond paste. A flexible fill hose or tube 84 is connected to the tube 82 and directs the bond paste to the shear web bond site. This hose 84 may be installed after the shell infusion process and may be left in the blade.

Detection of the bond paste at the downstream adjacent hose 52 may be accomplished in various ways. For example, the presence of the bond paste 36 within the adjacent hose 52 may be done by visual inspection. With this embodiment, the bond paste 36 would essentially fill the second hose and be visually detected within the hose. The bond paste 36 within the second hose 52, however, is not necessarily advantageous, and other detection methods may be used that do not necessarily depend on filling the downstream hose 52 with bond paste. For example, a sensing line may be connected to the adjacent downstream hose 52 to detect a change in air pressure (positive or negative) within the hose that is caused by migration of the bond paste 52 into the hose. For example, the sensing line may be connected to or include an ambient pressure detector that detects an increase of pressure within the hose 52 caused by the bond paste 36 starting to migrate into the hose.

In an alternative embodiment, detection of the bond paste 36 may be accomplished with a positive or negative pressure source (e.g., air line) connected to the adjacent downstream hose 52. When bond paste 36 initially migrates into the internal end of the adjacent hose 52, a restriction to the air flow is detected, for example, by detecting an increase in pressure within the air line. This pressure signal may be used as a control variable for terminating injection of the bond paste in the upstream supply line.

Presence of the bond paste 36 at the downstream hose 52 may also be empirically determined without actually detecting the bond paste. For example, the amount of bond paste 36 needed to fill the bond area between the adjacent hoses 52 may be known from the dimensions of the bond area and the process controlled as a function of the volumetric flow rate of the bond paste into the hoses such that, upon a measured amount of the bond paste being injected, the process is shifted to the next set of hoses. Likewise, the process may be controlled as a function of the time necessary to fill the bond area between adjacent hoses 52 at a known volumetric flow rate.

As the injection proceeds along the length of the bond line, the external ends of the hoses 52 are sealed or capped as the process moves to the next adjacent hose 52. Once the injection process is complete, the hoses may be cut at the surface of the shell members 20, 22 and sealed. Any manner of suitable finishing process may then be used to fill and cover the hose ends.

Referring for example to FIG. 8, the method may also include simultaneous bonding of multiple bond lines along the blade 16. For example, the bond paste 36 may be injected into the shear web bond line 35 and the leading edge bond line 32 in a simultaneous bonding process. The flow rates of the bond paste into the respective bond lines may be independently controlled, as well as the monitoring of the presence of the bond paste at the downstream hoses 52.

FIG. 5 depicts the trailing edge bond line 34 of FIG. 4 after injection of the bond paste 36 through the hose 52. The cap 58 has been forced or otherwise removed from the internal end 54 of the hose 52. The external end 56 of the hose is knotted, capped, or otherwise sealed as the process shifts to the next downstream hose 52. Upon completion of the injection process, all of the hoses 52 may be cut and sealed at their point of entry between the shell members 20, 22 and finished. Alternatively, as discussed above, the trailing edges may be trimmed along the trim line 57 such that no portion of the hoses 52 remain in the trailing edge bond line 34.

Figure 6:
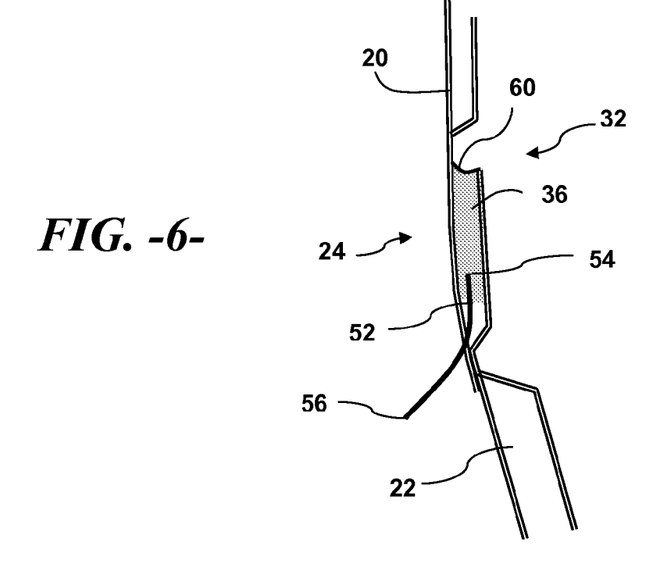
FIG. 6 is a side cut-away view of a bond configuration at the leading edge of a wind turbine blade.

FIG. 6 depicts filling of the leading edge bond line 32 between shell members 20, 22 through the supply hose 52, with migration of the bond paste 36 into the blade being prevented by the barrier 60, as discussed above.

The present invention also encompasses any manner of system used for accomplishing the bonding process discussed above. This system may include any manner of suitable bond paste delivery system configured with a distribution system that is in flow communication with the access ports along the wind turbine blade. In a particular embodiment depicted in FIG. 8, for example, this system may is embodied by a vehicle or machine 64 that is configured to travel along the length of the blade 16 in an automated or semi-automated bonding process. The bond paste delivery system in this embodiment includes a bond paste reservoir 72 and pump 74. The bond paste distribution system may include any configuration of conduction members for delivering the bond paste, such as injection hoses 66 and associated valves, manifolds, headers, and the like, to the various access ports. The pump 74 may be a variable displacement pump for filling different bond lines at different flow rates. In an alternative embodiment, multiple pumps may be provided for injecting multiple bond lines simultaneously at different flow rates. In the embodiment depicted in FIG. 8, a single pump 74 is used to inject paste along the sheer web bond line 35 simultaneously with the leading edge bond line 32 at essentially the same flow rate.

The system may include any manner of sensor that is configured to detect the presence of the bond paste 36 that migrates along the respective bond line from the first access port or hose 52 to the adjacent access port or hose. As discussed above, the sensor may include sensing or air lines 68 configured with the adjacent respective hoses 52 to detect a change in ambient pressure within the hose 52 caused by migration of the bond paste 32 into the hose. In an alternative embodiment, the sensing system may include a positive pressure air source 70 that injects air into the adjacent hoses 52 and, upon detection of a restriction to the air flow, a respective control signal is generated indicating the presence of the bond paste at the hose 52. The sensing system may utilize a sensor to detect changes in light conditions within the tubes 52 as a result of migration of the bond paste along the hoses.

The system may include any manner of suitable controller 76 configured in communication with the pump 74 and sensing components to control and coordinate the injecting steps.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for bonding component parts of a wind turbine blade along a bond line, comprising:

placing at least one barrier within an internal cavity of the blade at a defined bond line width along the length of the bond line;

defining a plurality of spaced apart external access ports along the bond line, into the internal cavity;

sequentially injecting a bond paste into the plurality of access ports to fill the bond line;

wherein the method is used to form a bond line between upper and lower shell members of the turbine blade;

wherein the sequentially injecting step includes injecting the bond paste into a plurality of hoses at the external access ports, wherein the injecting step is sequenced to a next subsequent hose upon detection of the bond paste at the respective next subsequent hose; and wherein presence of the bond paste at the next subsequent hose is determined by detecting a change in air pressure in the hose caused by the presence of the bond paste within the internal cavity migrating to the hose.

2. The bonding method as in claim 1, wherein air is injected into the next subsequent hose and comprising detecting a change in the restriction of the airstream through the hose caused by the presence of the bond paste within the internal cavity migrating to the hose.

3. The bonding method as in claim 1, further comprising leaving at least part of the hoses permanently in a gap between the shell members or in holes defined within the shell members and sealing the external end of the hoses.

4. The bonding method as in claim 1, wherein the method is used for bonding a shear web bond line, the access ports defined through either or both of upper and lower shell members of the turbine blade or through a gap between either or both of upper and lower shell members.

5. The bonding method as in claim 1, wherein the method is used for bonding a leading or trailing edge bond line, the access ports defined through either or both of upper and lower shell members of the turbine blade or through a gap between the upper and lower shell members.

6. The bonding method as in claim 1, wherein the injecting step is performed by an injection system that sequentially connects and disconnects to the access ports as the system moves along the bond line.

7. The bonding method as in claim 6, wherein the injection system includes a machine that moves along the bond lines, the machine having a supply of the bond paste and being connectable to the respective access ports.

8. The bonding method as in claim 7, wherein the injection machine simultaneously fills multiple bond lines along the turbine blade.

9. The bonding method as in claim 1, comprising sealing the barrier in place within the internal cavity between opposing internal structures of the turbine blade.

* * * * *